(12) United States Patent
Konno et al.

(10) Patent No.: US 6,231,365 B1
(45) Date of Patent: May 15, 2001

(54) MEMORY CARD CONNECTOR

(75) Inventors: Takeshi Konno, Higashi Ibaraki-Gun; Yoshinori Ota, Hitachi Naka, both of (JP)

(73) Assignee: Mitsumi Electric Co., Ltd. (JP)

( * ) Notice: Subject to any disclaimer, the term of this patent is extended or adjusted under 35 U.S.C. 154(b) by 0 days.

(21) Appl. No.: 09/573,925

(22) Filed: May 18, 2000

(30) Foreign Application Priority Data

May 31, 1999 (JP) .................................................. 11-151368

(51) Int. Cl.[7] ..................................................... H01R 13/62
(52) U.S. Cl. ............................................... 439/331; 16/232
(58) Field of Search .................................... 439/331, 326, 439/487, 718; 16/231, 232

(56) References Cited

U.S. PATENT DOCUMENTS 5,045,640 * 9/1991 Riceman ................................ 439/136
5,226,826 * 7/1993 Nillson et al. ......................... 439/331

\* cited by examiner

Primary Examiner—Neil Abrams
Assistant Examiner—Phuong KT Dinh

(74) Attorney, Agent, or Firm—Morrison Law Firm

(57) ABSTRACT

A memory card connector 10, wherein when a holder cover 20, which is in contact with an obstacle or stopper and the like, is opened further, deformation and damage to the holder cover can be avoided, by deliberately allowed elastic separation of the holder cover 20 from housing 11 at hinge to prevent damage; the connector 10, includes a housing 11, which houses a memory card; the holder cover 20, covering the memory card; a plurality of connection terminals 14, are built into the housing so that one end is opposite a contact part of the memory card housed inside the housing and is exposed at the surface of the housing and the other end protrudes from an edge of the housing, the holder cover is supported at one side edge which is sideways with respect to the longitudinal direction of the connector, so that, by pivoting around a rotation shaft 15 provided on one side edge of the housing, the holder cover 20 can be opened and closed with respect to housing 11; a hinge part 21, which latches onto the rotation shaft of the holder cover comprises a first section 21a, which, in cover closed position, contacts the rotation shaft on the housing side at an angle range of approximately 180 degrees or less and is formed in an approximate U-shape, and a second section 21b, which, similarly in the closed position, surrounds the rotation shaft on the housing side at an angle range of approximately 180 degrees or greater.

9 Claims, 10 Drawing Sheets

MEMORY CARD CONNECTOR

BACKGROUND TO THE INVENTION

The present invention relates to a connector for a memory card, such as for a Subscriber ID Entity Module (SIM) card and the like. Referring to FIGS. 9 through 13(A) and (B), there is shown a construction for this type of memory card connector of the prior art.

Referring to FIGS. 9 through 13(A) and (B), a memory card connector 1 is constructed from a housing 2 and a holder cover 3.

Housing 2 is provided on its upper surface with a space 2a, which is for receiving a SIM card 4 as the memory card. Housing 2 is also provided with a perimeter wall 2b which surrounds space 2a.

In addition, housing 2 is provided with a plurality of connection terminals 5 (in the drawing, there are three). The area near one end of each of connection terminals 5 protrudes at the upper surface of housing 2. Each of the other ends protrudes in a row at the opposing edges of housing 2 (in the drawing, the left and right edges).

Furthermore, referring to FIG. 9, housing 2 is provided with a rotation shaft 2c, which protrudes outward (in the upward and downward direction of FIG. 9) from both ends of the right edge in FIG. 9.

Holder cover 3 is provided with a hinge part 3a, which latches onto rotation shaft 2c, which is provided on the housing. Holder cover 3 has a construction wherein by hinge part 3a latching onto rotation shaft 2c, holder cover 3 can rotate with respect to housing 2.

Furthermore, holder cover 3 is provided with memory card latching tabs 3b and locking tabs 3c, which extend downward from both side edges (the upper and lower edges in the figure) and are further extended inward.

Hinge part 3a is constructed from a slot 3d, which extends towards both side edges of holder cover 3. Hinge part 3a is constructed so that rotation shaft 2c is capable of sliding within slot 3d.

According to this, holder cover 3 is brought from the open position shown in FIG. 9 and FIGS. 10(A) and (B) to the closed position shown in FIG. 12 by rotating around rotation shaft 2c as shown in FIG. 11. Furthermore, referring to FIG. 12, while rotation shaft 2c slides within slot 3d, holder cover 3 is moved towards the right with respect to housing 2, and it is brought to the locked position shown in FIGS. 13(A) and (B).

Referring to FIGS. 13(A) and (B), in this locked position, locking tab 3c, which is provided on holder cover 3, latches onto a latching part 2d, which is provided on the side edges of housing 2. As a result, holder cover 3 is locked onto housing 2.

Referring to FIG. 10(B), near its lower surface, housing 2 is provided with a stopper 2e, which is adjacent to rotation shaft 2c. With this, when holder cover 3 rotates around rotation shaft 2c, the rim of hinge part 3a contacts stopper 2e, and as a result, holder cover 3 is restricted so it does not open 180 degrees or greater with respect to housing 2.

According to memory card connector 1 with this construction, first, as shown in FIG. 9, holder cover 3 is in an open position in which holder cover 3 is open approximately 180 degrees with respect to housing 2. Memory card 4 is set on the inside of memory card latching tabs 3b of holder cover 3 (refer to FIGS. 10(A) and (B)).

Next, referring to FIG. 11, as indicated by letters A, B, C, D, E, by rotating holder cover 3 in sequence with respect to housing 2, holder cover 3 is brought to a closed position as shown in FIG. 12.

Next, referring to FIG. 12, holder cover 3 slides with respect to housing 2 in the direction indicated by arrow X. By the latching of locking tab 3c of holder cover 3 onto latching part 2d of housing 2, holder cover 3 is locked to housing 2.

At this time, the contact part of memory card 4, which has been set inside holder cover 3, contacts one end of the corresponding connection terminal 5, which is provided on housing 2. In addition, the contact part of memory card 4 is pressed against one end of connection terminal 5 by holder cover 3.

Memory card connector 1 is mounted in various devices, such as telephones, telecommunication devices and the like and is connected with these various devices.

With memory card connector 1 with this construction, holder cover 3 is supported in a manner which allows for rotation around rotation shaft 2c, which is sideways with respect to the insertion direction of connector 1. Therefore, in a situation wherein holder cover 3 is opened 180 degrees with respect to housing 2 (see FIGS. 10(A) and (B)) or in a situation wherein holder cover 3 is in position B of FIG. 11 while in contact with a mobile phone body or the like shown by the dashed line, in these situations, if holder cover 3 is rotated so that it is opened further with respect to housing 2, holder cover 3 itself or its hinge part 3a can become deformed and may even break.

OBJECT AND SUMMARY OF THE INVENTION

Learning from the above points, the object of the present invention is to provide a memory card connector, wherein, when a holder cover is opened further while in contact with an obstacle or stopper and the like, deformation or damage to the holder cover can be avoided.

The above object can be achieved with the present invention of a memory card connector, the memory card connector being constructed from: a housing, which houses a memory card; a holder cover, which covers the memory card housed inside the housing; a plurality of connection terminals, which are built into the housing so that one end is opposite a contact part of the memory card housed inside the housing and is exposed at the surface of the housing and the other end protrudes from an edge of the housing, wherein: at one side edge which is sideways with respect to the longitudinal direction of the connector, the holder cover is supported so that, by pivoting around a rotation shaft provided on one side edge of the housing, the holder cover can be opened and closed with respect to the housing; the hinge part which latches to the rotation shaft of the holder cover is constructed from a first section, which, in the cover closed position, contacts the back side of the rotation shaft in the angle range of approximately 180 degrees or less and is formed in an approximate U-shape, and a second section, which in the cover closed position, surrounds the rotation shaft at the back of the rotation shaft in the angle range of approximately 180 degrees or greater.

In the memory card connector of the present invention, preferably, the first section and second section of the hinge part of the holder cover are disposed in an alternating manner along the rotation shaft.

According to the above construction, the holder cover is capable of pivoting with respect to the housing at one side edge which is sideways with respect to the connector insertion direction. There are situations wherein the holder cover is opened and is in contact with various device bodies and the like. When the holder cover is in an open state, the first section contacts the rotation shaft at approximately the opposite side as the housing. As a result, if the holder cover is opened further, even if the holder cover is rotated in the opening direction with a relatively weak force, the hinge part of the holder cover separates from the rotation shaft due to the deformation in the second section.

Therefore, when opening the holder cover, if a part of the holder cover is in contact with the various device bodies and the like and the holder cover is further rotated in the opening direction, the hinge part of the holder cover separates from the rotation shaft, and deformation or damage to the holder cover is avoided.

In the situation wherein the first section and second section of the hinge part of the holder cover are disposed along the rotation shaft in an alternating manner, the second section, which latches to the rotation shaft, is dispersed over the entire length of the hinge part. As a result, the latching force of the hinge part to the rotation shaft is uniform over the rotation shaft in the shaft direction. The rotation of the holder cover with regard to the rotation shaft can be conducted smoothly.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Referring to the embodiments shown in the figures, the present invention will be described in detail below.

Figure 1:
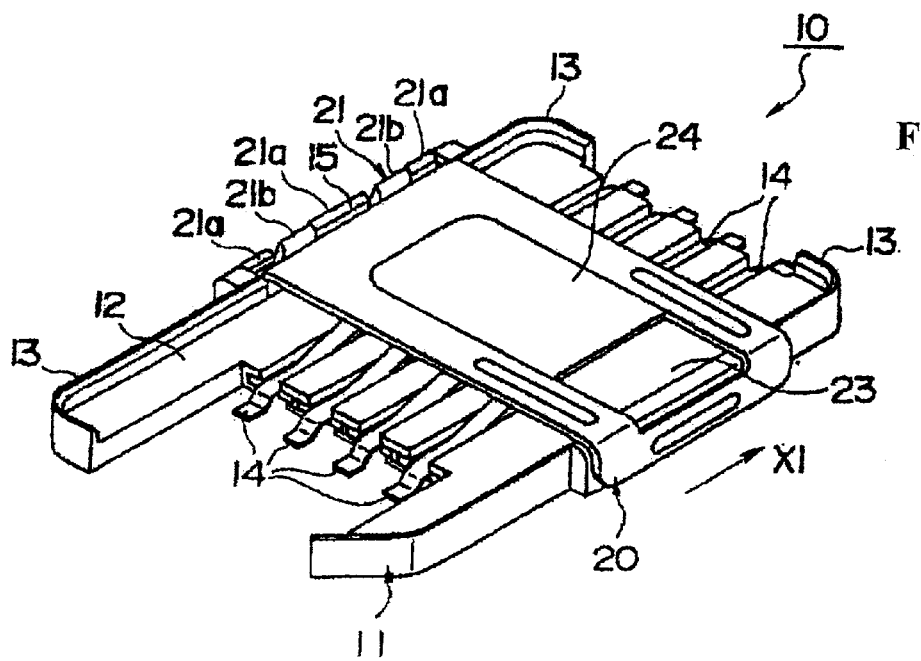
FIG. 1(A) is a perspective view.
FIG. 1(B) a cross-section view of a first embodiment of the memory card connector of the present invention in lock position.
Figure 1B:
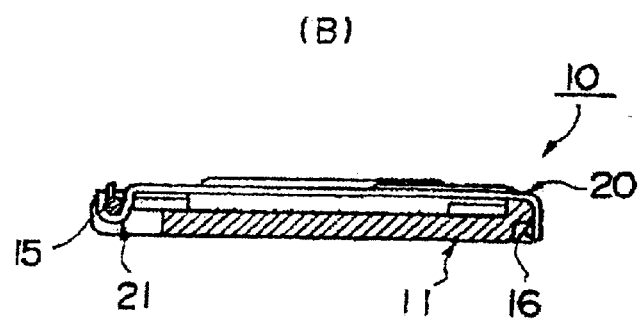
Figure 2:
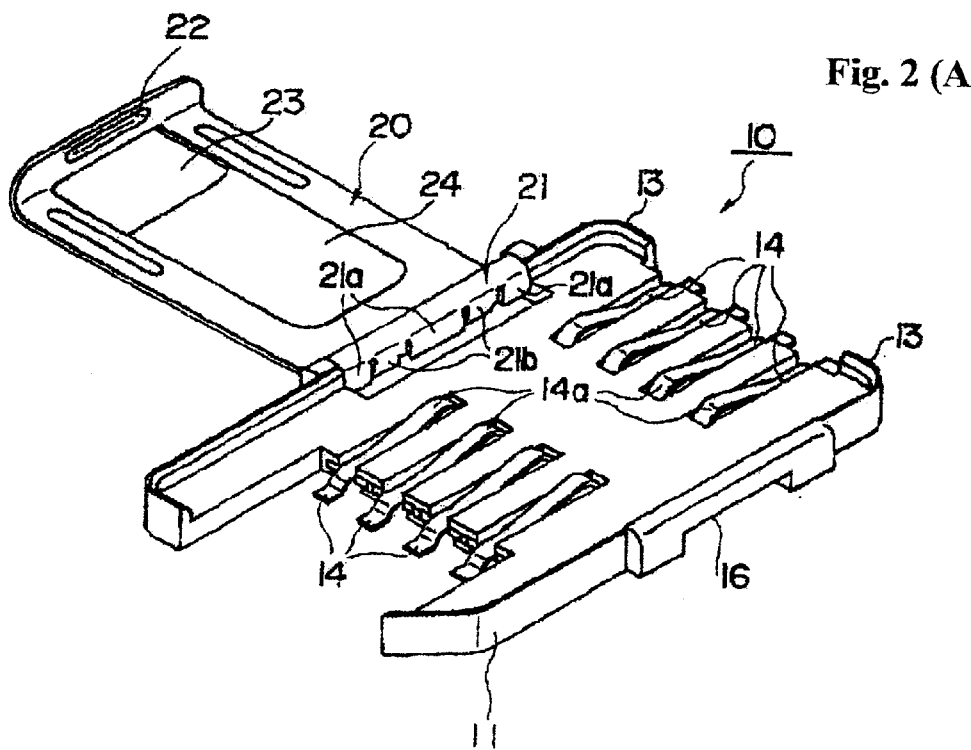
FIG. 2(A) is a perspective view.
FIG. 2(B) a cross-section view of the FIG. 1 connector in open position.
Figure 2:
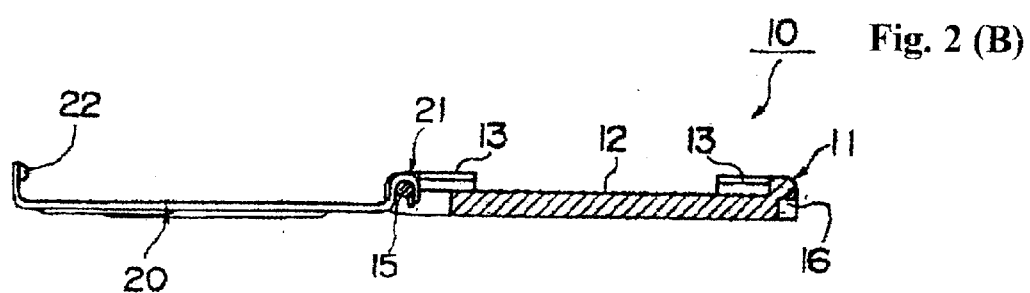
Figure 3:
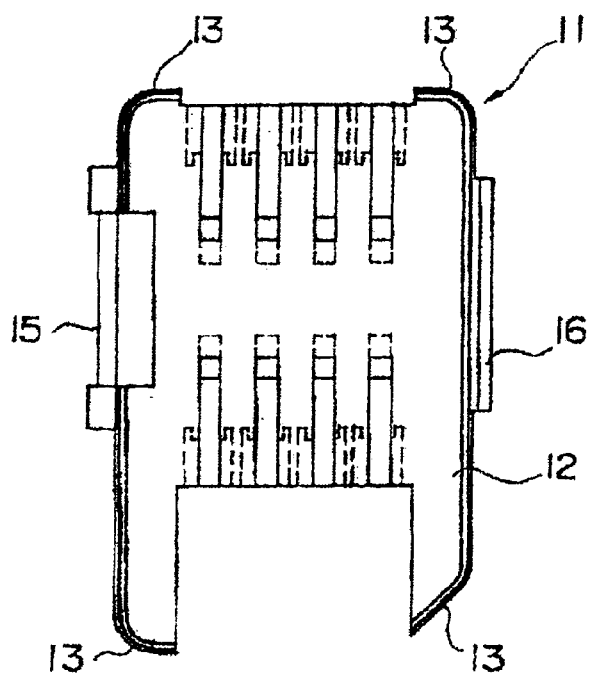
FIG. 3 is a plan view of the housing of the memory card connector of FIG. 1.

Referring to FIGS. 1 through 3, there is shown the construction for the first embodiment of the memory card connector according the present invention.

Referring to FIGS. 1(A),1(B) and 2(A),2(B), a memory card connector 10 is constructed from a resin housing 11 and a metal holder cover 20.

Referring to FIG. 3, housing 11 is provided on its top surface with a space 12, which is for receiving the SIM card as the memory card. In addition, housing 11 is provided with a perimeter wall 13 which surrounds space 12.

In addition, housing 11 is provided with a plurality of connection terminals 14 (in the figure, there are 4), whose area near one end protrudes at the top surface of housing 11, and each of the other ends protrudes in a row at the opposing edges of housing 11 (in FIG. 1(A), the edges at left front and right back).

Furthermore, housing 11 is provided with a rotation shaft 15, which extends along one side edge (in FIG. 1(A), the side edge at the left rear) which is sideways with respect to the longitudinal direction X1 of the connector which is to be inserted.

Figure 4A:
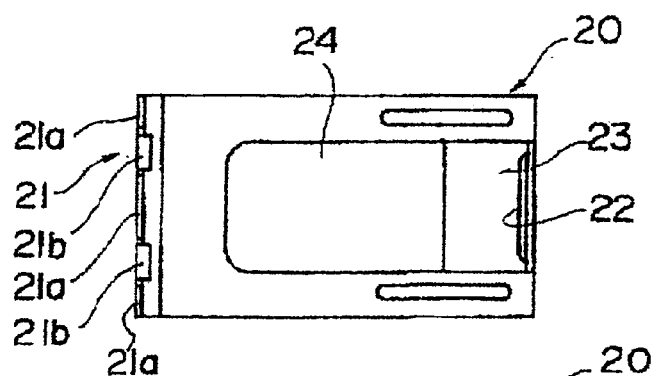
FIG. 4(A) is a plan view.
Figure 4B:
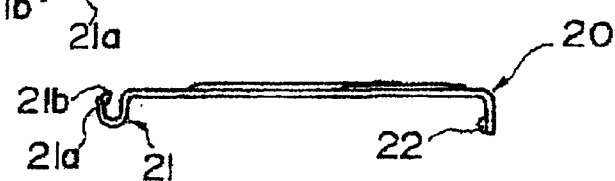
FIG. 4(B) a front view.
Figure 4C:
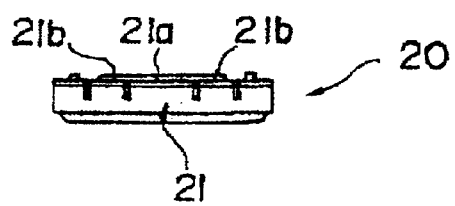
FIG. 4(C) a side view showing the holder cover of the memory card connector of FIG. 1.

Referring to FIG. 4, holder cover 20 is constructed entirely from a metal or elastic material. In addition, on one of its side edges, there is a hinge part 21 which latches with rotation shaft 15 which is provided on housing 11. Holder cover 20 is constructed so that by having hinge part 21 latch with rotation shaft 15, holder cover 20 can rotate with respect to housing 11.

Furthermore, holder cover 20 is provided with a hook 22, which protrudes inward from the other side edge of holder cover 20 (in the figure, the vertical edge).

As will be described later, when holder cover 20 is brought to the closed position, hook 22 latches to a latching part 16 which is provided on housing 11.

Hinge part 21 extends along rotation shaft 15 of holder cover 20. In addition, hinge part 21 is constructed from a first section 21a and a second section 21b. In the closed position shown in FIG. 1, first section 21a has a cross-section which is open at top. In other words, first section 21a is an approximate U-shape which contacts the back or bottom side of rotation shaft 15 for an angle range of approximately 180 degrees. Similarly, in the closed position, second section 21b is open at top. In other words, second section 21b surrounds rotation shaft 15 in contact at the bottom side too but for an angle range of at least more than 180 degrees. Second section 21b is of U-shape also, but has a free tip end part that curves slightly more around the pivot shaft than does first section 21a.

First section 21a and second section 21b are disposed in an alternating manner. In the figure, on hinge part 21, second sections 21b are disposed between first sections 21a which are on both ends and in the middle.

By having second section 21b surround rotation shaft 15 in the above noted manner, hinge section 21b serves to retain the hinge piece mounted on the pivot shaft 15 during a rotation between full open and full closed condition and with the exception of the deliberately allowed separation therefrom as will be described shortly below and which is allowed for the purpose of prevention of a damage to the cover and/or hinge piece in a particular card connector use.

According to this, holder cover 20 is brought from the open position shown in FIGS. 2(A),2(B) to the closed position by rotating one side edge around rotation shaft 15. By latching hook 22 to latching part 16 of housing 11, holder cover 20 can be locked.

Furthermore, referring to FIGS. 1(A),1(B) and 2(A),2(B), holder cover 20 is provided on the other side edge with a window 23 for latching of fingers during opening and closing, and a protruding part 24, which is adjacent to window 23 and which is formed expanding upward.

Memory card connector 10 of the present invention is constructed as described above. First, referring to FIG. 2(A), the user inserts his finger into protruding part 24 from window 23 of holder cover 20. By rotating holder cover 20 around rotation shaft 15, holder cover 20 is brought to an open position in which it is opened approximately 180 degrees with respect to housing 11. In this condition, the user sets the memory card (not shown) inside space 12 of housing 11.

Next, by rotating holder cover 20 with respect to housing 11 around rotation shaft 15, holder cover 20 is brought to the closed position shown in FIG. 1(A).

Hook 22 of holder cover 20 latches onto latching part 16 of housing 11, and as a result, holder cover 20 becomes locked onto housing 11.

At this time, with the memory card which has been set inside holder cover 20, the contact part contacts peaks 14a of the corresponding connection terminals 14 which are provided on housing 11. In addition, the contact parts are pressed against peaks 14a of connection terminals 14 by holder cover 20.

Memory card connector 10 is attached by soldering connection terminals 14 to a circuit pattern on a substrate of a mobile phone or the like which is not shown.

In this manner, the memory card is attached to memory card connector 10, which is built into various devices such as telephones or telecommunication devices and the like.

In this situation, of hinge part 21, only second section 21b surrounds rotation shaft 15, and by this, holder cover 20 is latched to rotation shaft 15. First section 21a contacts rotation shaft 15 in an angle range of approximately 180 degrees. Therefore, when holder cover 20 is locked in the closed position, hinge part 21 is latched to rotation shaft 15 by both first section 21a and second section 21b which contacts the pivot shaft 15 at the bottom side thereof, and the memory card is securely held.

Figure 5A:
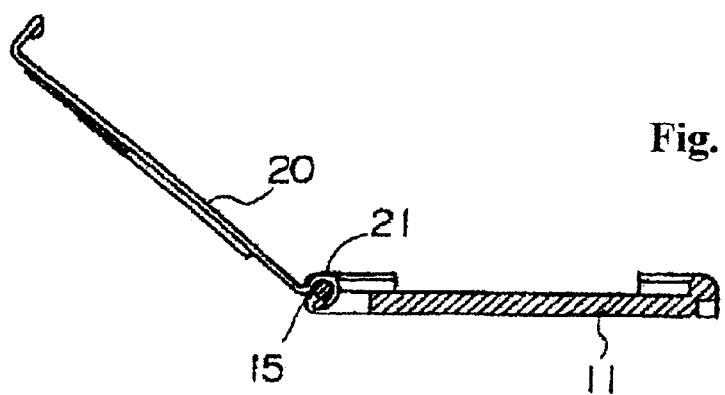
FIG. 5(A) is a cross section showing the movement of the memory card connector of FIG. 1(A) in the open position.

Referring to FIG. 5(A), when holder cover 20 is opened, hinge part 21 also rotates with respect to rotation shaft 15. Because first section 21a of hinge part 21 is positioned on the front or top side of rotation shaft 15, it is no longer restrained by rotation shaft 15. Second section 21b, although its U-shape is mostly disposed at the top side of pivot shaft 15, still has a retentive gird about the pivot shaft as seen of its tip end positioning in FIG. 5(A) and keeps the hinge mounted on the shaft.

Figure 5B:
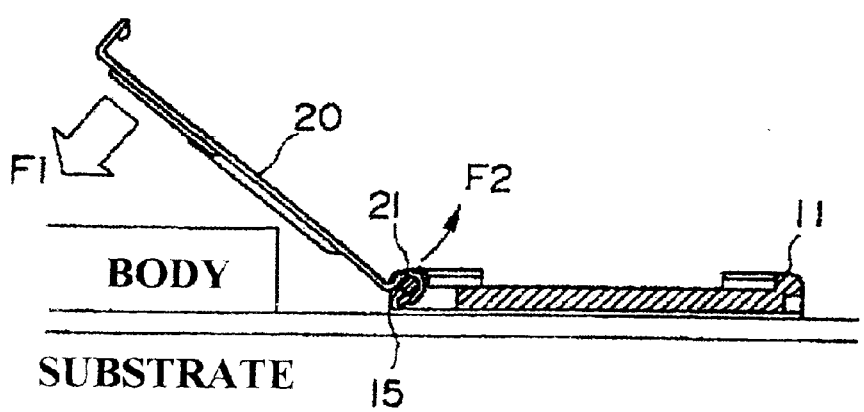
FIG. 5(B) showing when it is in contact with a body cover and the like of various devices, and FIG. 5(C) showing when the hinge part of the holder cover has fallen off.

In this condition, referring to FIG. 5(B), holder cover 20 contacts the body of a mobile phone device or the like into which memory card connector 10 is installed. Furthermore, when a force F1 is applied in the direction of opening of holder cover 20 and holder cover 20 is rotated, using the contact point with the various device body cover and the like as the point of support, a force F2 in the direction of separation from rotation 15 acts by reaction on hinge part 21 of holder cover 20.

Figure 5C:
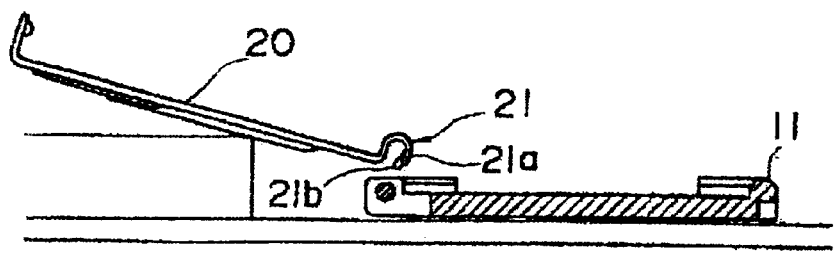

With this, second section 21b of hinge part 21 and particularly its free tip end, elastically deforms so the "U" widens and the hinge piece separates from rotation shaft 15. Referring to FIG. 5(C), hinge part 21 of holder cover 20 separates from rotation shaft 15 of housing 11. As a result, deformation or damage to a part of holder cover 20 is avoided.

It is understood that with the cover open, the contact courses of the hinge piece two sections are on the top side of the pivot shaft. Thus, when the levering force F1 is applied against the cover tending to separatre the hinge piece from the pivot shaft (as the effect of reaction force F2), the first and second sections lift upwardly from the pivot shaft without obstruction to such movement or any untoward effect on the cover itself.

Figure 6:
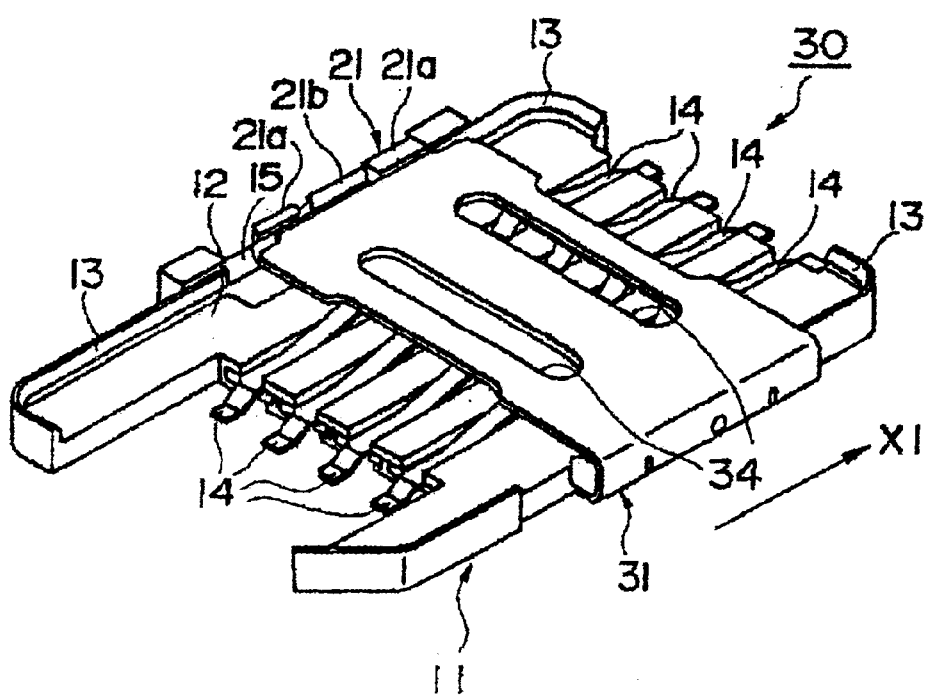
FIG. 6 is a perspective view showing the construction of a second embodiment of the memory card connector of the present invention in the lock position.
Figure 7A:
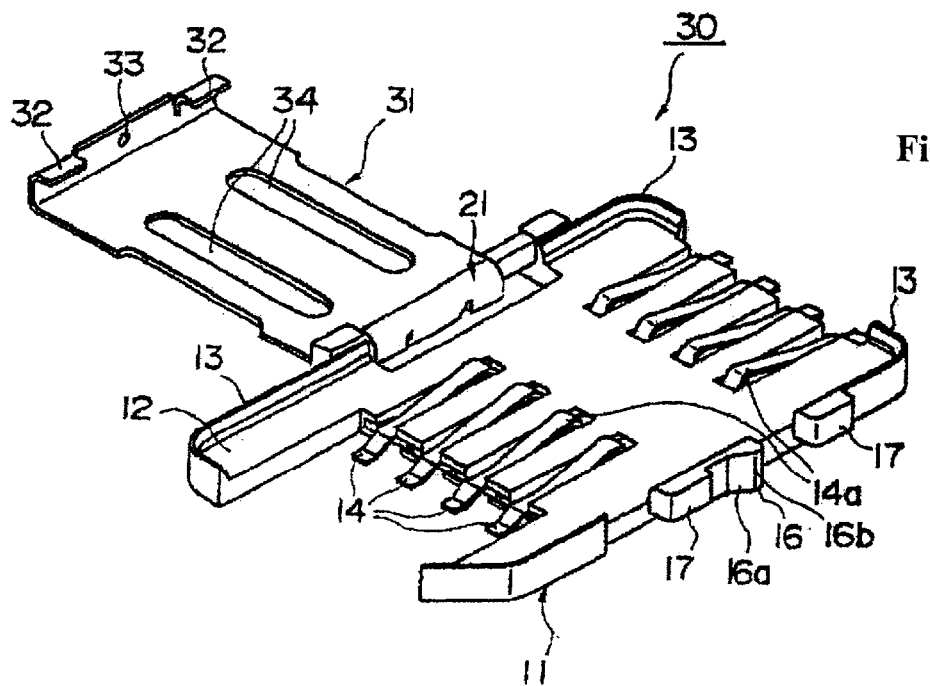
FIG. 7(A) is a perspective view.
Figure 7B:
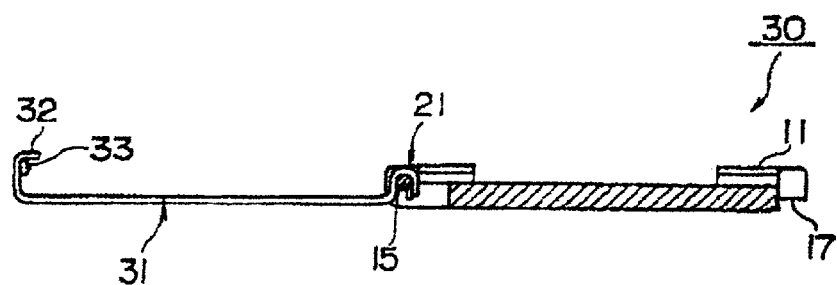
FIG. 7(B) a cross-section showing the memory card connector of FIG. 6 in the open position.

Referring to FIGS. 6 through 8, a second embodiment of the memory card connector according to the present invention is shown.

Referring to FIGS. 6 through 8(A) and (B), a memory card connector 30 has approximately the same construction as memory card connector 10 shown in FIGS. 1 through 5, but they differ in the following points.

Holder cover 31 is supported in a manner which allows for rotation around rotation shaft 15. In addition, holder cover 31 is supported in a manner which allows for sliding along rotation shaft 15 in the longitudinal direction X1 of connector 30.

Figure 8A:
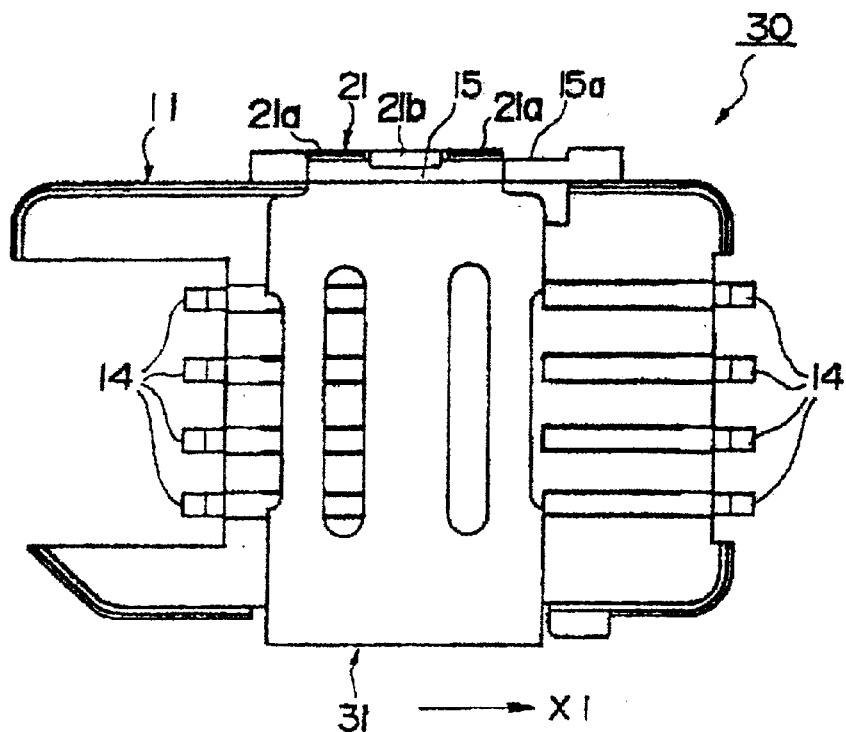
FIG. 8(A) is a plan view showing the memory card connector of FIG. 6 in closed position and FIG. 8(B) a plan view showing it in lock position.
Figure 8B:
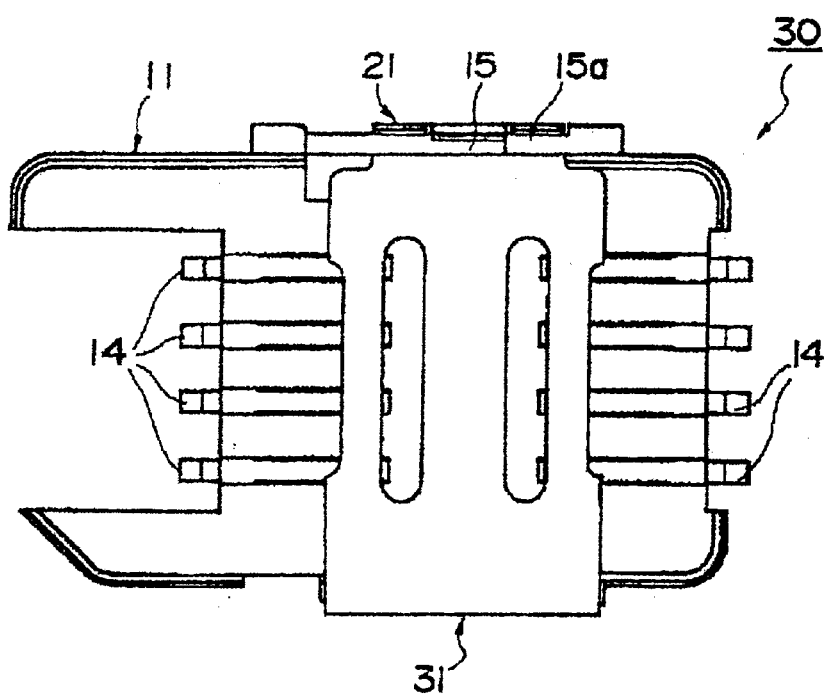
Figure 9:
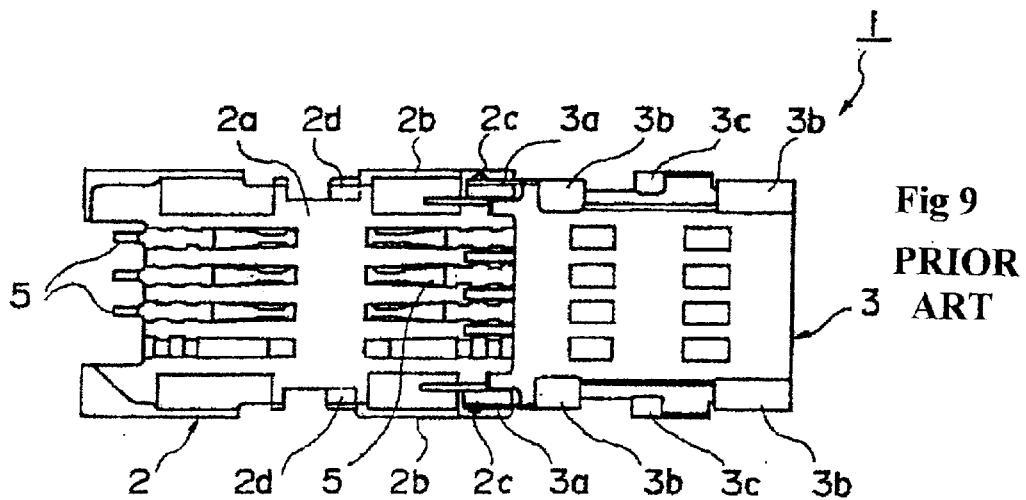
FIG. 9 is a plan view of one example of a memory card connector of the prior art in the open position.
Figure 10A:
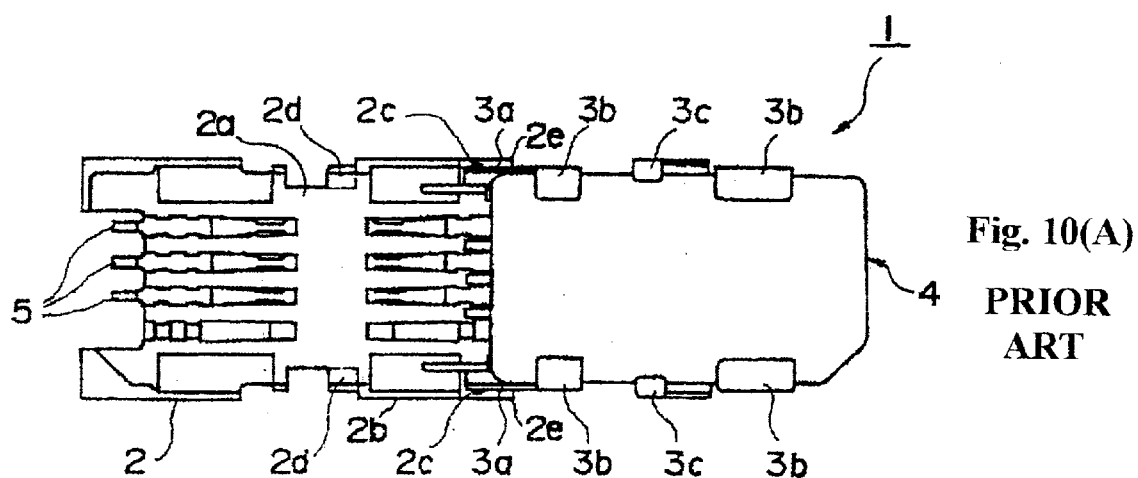
FIGS. 10(A) and 10(B) are respective plan and side view showings of the memory card connector of FIG. 9 in open position with the memory card inserted.
Figure 10B:
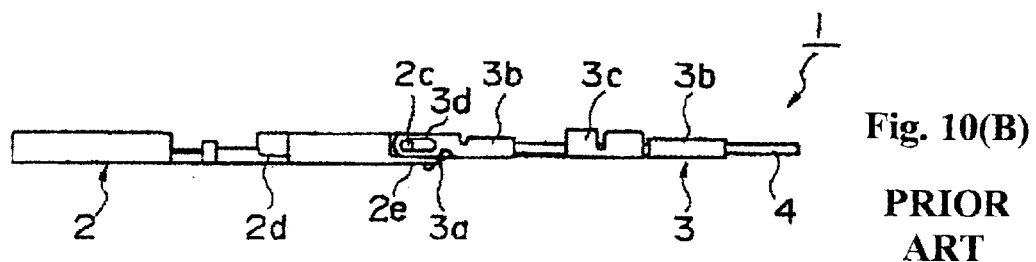
Figure 11:
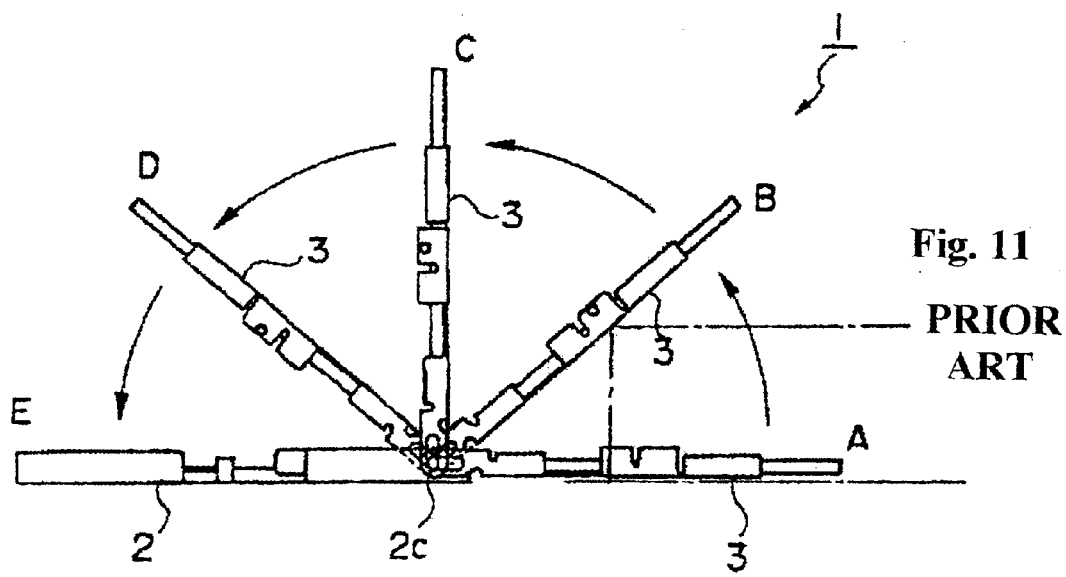
FIG. 11 is a side view showing the pivoting sequence of the holder cover from open position to closed position for the memory card connector of FIG. 9.
Figure 12:
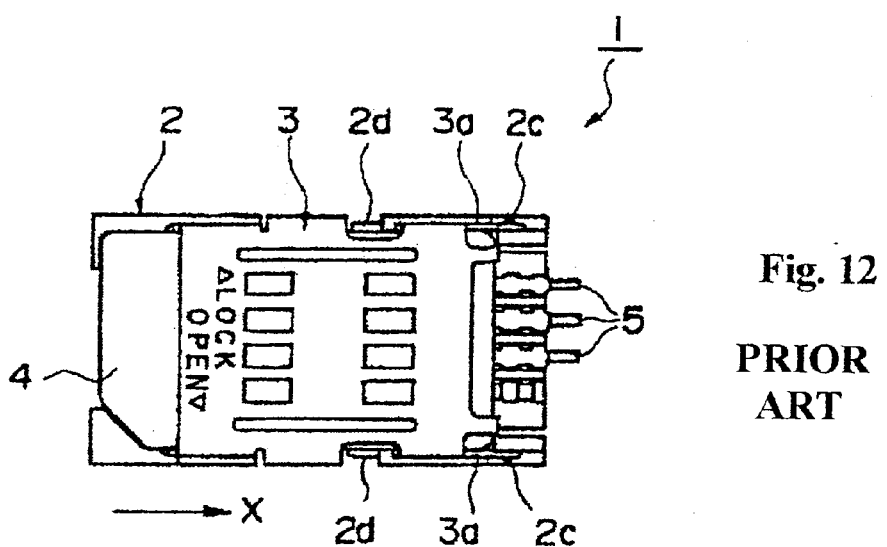
FIG. 12 is a plan view of the memory card connector of FIG. 9 in closed position.
Figure 13:
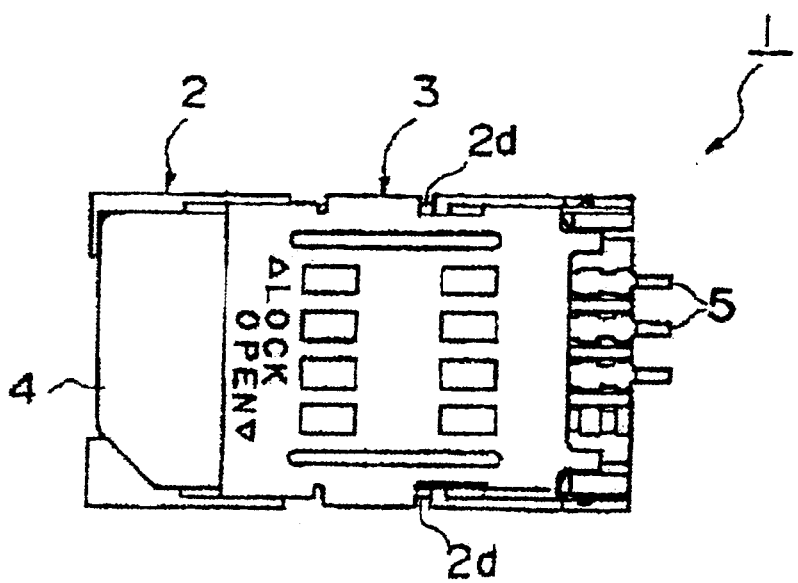
FIG. 13(A) is a plan view.
FIG. 13(B) a side view showing the memory card connector of FIG. 9 in lock position.
Figure 13:
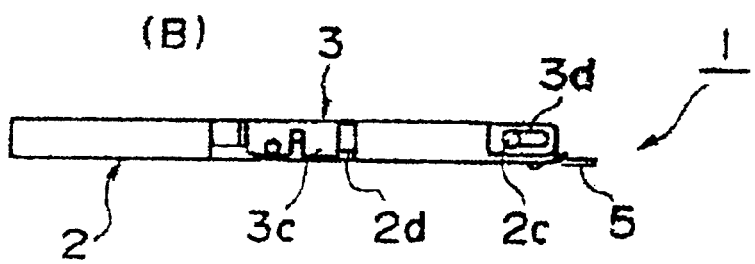

Referring to FIGS. 8(A),8(B), as shown in detail, hinge part 21 of holder cover 31 is constructed from two first sections 21a on both sides and one second section 21b between these.

Rotation shaft 15 is formed overall with a circular cross-section. In addition, the region corresponding to the lock position is a modified shape part 15a. Its cross-section is of a different shape which corresponds to the shape of first section 21a of hinge part 21 of holder cover 31. In the drawing, it is formed in a U-shape.

According to this, only when it is in the closed position, does the shape of first section 21a of hinge part 21 conform to the shape of modified shape part 15a. Holder cover 31 can then slide to the lock position.

Furthermore, instead of hook 22 shown in the first embodiment, holder cover 31 is provided with tongue pieces 32 as the locking tabs which extends from the other side edge (in the figure, the vertical edge) downwards and further extends inwards.

As will be described later, when holder cover 31, from the closed position, slides along rotation shaft 15 in the X1 direction, tongue pieces 32, latch to projecting parts 17 which are provided on resin housing 11.

Furthermore, in the lock position shown in FIG. 6, holder cover 31, on its other side edge, is equipped with a protuberance 33 which projects inwards so that it can latch to latching part 16 formed on the other side edge of housing 11.

Protuberance 33 is formed in a unitary manner with holder cover 20 which is of elastic material.

According to this, from the open position shown in FIG. 7(A), by rotating one side edge around rotation shaft 15, holder cover 31 is brought to the closed position. Hinge part 21 further slides along rotation shaft 15. Referring to FIG. 6, by moving holder cover 31 in the X1 direction with respect to housing 11, holder cover 31 is brought to the lock position shown in FIG. 6.

In this lock position, tongue pieces 32, provided on holder cover 31, latches onto projecting parts 17, provided on the side edge of housing 11. As a result, holder cover 31 is locked onto housing 11.

At this time, protuberance 33, which is provided on holder cover 31, slides along an incline surface 16a, which is provided on a latching part 16. When protuberance 33 passes peak 16b of latching part 16, protuberance 23 rides across peak 16b, and a clicking feel is generated. As a result, the lock status is easily known.

Furthermore, instead of window 23 and protruding part 24 as in memory card connector 10 shown in FIGS. 1 through 5(C), holder cover 31 is provided with a window 34, comprising two slots which are parallel to each other and extend perpendicular to rotation shaft 15.

According to memory card connector 30 with this construction, in the condition shown in FIGS. 6 and 8(B), the user inserts his finger into window 34 and moves holder cover 31 along rotation shaft 15 in the opposite direction as arrow X1 (shown in FIG. 8(A)). Next, by rotating holder cover 31 around rotation shaft 15, holder cover 31 is brought to the open position in which it is opened approximately 180 degrees with respect to housing 11. In this condition, the user sets the memory card (not shown) inside space 12 of housing 11.

Next, by rotating holder cover 31 around rotation shaft 15 with respect to housing 11, holder cover 31 is brought to the closed position shown in FIG. 8(A).

Next, by sliding holder cover 31 along rotation shaft 15 in the direction of arrow X1 of FIG. 8(A) with respect to housing 11, holder cover 31 is brought to the lock position shown n FIGS. 6 and 8(B).

Because it is in a closed position, the shape of first section 21a of hinge part 21 of holder cover 31 conforms to the shape of modified shape part 15a of rotation shaft 15. As a result, holder cover 31 can slide along rotation shaft 15 to the lock position.

Referring to FIGS. 6 and 8(B), when holder cover 31 slides to the lock position shown, tongue piece 32 latches to projecting part 17 of housing 11. Holder cover 31 is locked to housing 11.

At this time, with the memory card which has been set inside holder cover 31, the contact part contacts peaks 14a of the corresponding connection terminals 14 which are provided on housing 11. In addition, the contact parts are pressed against peaks 14a of connection terminals 14 by holder cover 31.

In this manner, the memory card, housed inside memory card connector 30 which is built into various devices such as telephones or telecommunication devices and the like, can be connected with these various devices.

In this situation, as with the previously described holder cover 20, when holder cover 31 is locked in the closed position, hinge part 21a is latched to rotation shaft 15 by both first section 21a and second section 21b, and the memory card is securely held. In addition, when holder cover 31 is opened, hinge part 21 also rotates with respect to rotation shaft 15. First section 21a of hinge part 21 becomes positioned in front of rotation shaft 15 and is no longer restrained by rotation shaft 15.

Therefore, in this condition, when holder cover 31 is in contact with the body of various devices as shown in FIG. 5(B) and holder cover 31 is rotated so that it opens further, the position of contact to the various devices and the like acts as the support point, and by reaction, a force in the direction of separation from rotation shaft 15 acts on hinge part 21 of holder cover 31.

According to this, second section 21b of hinge part 21 elastically deforms and separates from rotation shaft 15. Hinge part 21 of holder cover 20 separates from rotation shaft 15 of housing 11. Deformation or damage to a part of holder cover 20 is avoided.

Furthermore, with the above embodiment, there were two sets of four connection terminals 14 each, but the present invention is not limited to this. The present invention can be used as a memory card connector provided with any number of connection terminals corresponding to the number of contact parts on the memory card to be used.

As described above, according to the present invention, the holder cover pivots with respect to the housing at one side edge, which is sideways with respect to the connector insertion direction. When inserting into various devices, even if the holder cover is opened, a part of the holder cover does not readily contact the various device bodies and the like. There may be a situation wherein the holder cover is in contact with various device bodies and the like. When the holder cover is in an open state, the first section contacts the rotation shaft at approximately the opposite side as the housing. As a result, if the holder cover is opened further, even if the holder cover is rotated in the opening direction with a relatively weak force, the hinge part of the holder cover separates from the rotation shaft due to the deformation in the second section.

Therefore, when opening the holder cover, if a part of the holder cover is in contact with the various device bodies and the like and the holder cover is further rotated in the opening direction, the hinge part of the holder cover separates from the rotation shaft, and deformation or damage to the holder cover is avoided.

According to the present invention, when the holder cover is in contact with an obstacle or a stopper and the like and is then further opened, deformation or damage to the holder cover is avoided. An excellent memory card connector is provided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A memory card connector comprising:
    an elongated housing for holding a memory card with said memory card positioned longitudinally in said housing;
    said housing including terminal structure connectable with said memory card;
    a pivot shaft connected to said housing,
    a cover pivotably connected on said pivot shaft at one of two opposite cover sides to said housing along one of two opposite sides;
    said cover in a closed position covering said memory card and pressing said memory card to said terminal structure;
    a hinge piece on said cover one side;
    said hinge piece including at least a first section that in a cover closed condition is in a girding contact with a bottom side of said pivot shaft over a contact course of up to about 180 degrees;

said hinge piece including at least a second section that in a cover closed condition is in a girding contact with said bottom side in a contact of more than 180 degrees; and said contact course of said first and said second sections being in contact with a top side of said pivot shaft when said cover is in a cover open position, whereby a levering force applied against said cover tending to separate said hinge piece from said pivot shaft, lifts said first and second sections upwardly from said pivot shaft without frangible obstruction to such movement.

2. A memory card connector as in claim 1, wherein:

said first and second sections each have an arched-shaped cross section.

3. A memory card connector as in claim 2, wherein:

said second section has a free tip end curving around said pivot shaft.

4. A memory card connector as in claim 2, wherein:

said hinge piece comprises a plurality of said first and second sections alternating along said cover one side.

5. A memory card connector comprising:

a base housing;

a U-shaped slot in an edge of said base housing;

a shaft spanning said U-shaped slot parallel to a first edge of said housing;

first and second ends of said shaft being affixed in said housing adjacent said U-shaped slot leaving a free portion of said shaft where said shaft spans said U-shaped slot;

a cover;

a U-shaped hinge part along a first edge of said cover;

said U-shaped hinge part being fittable on said shaft to permit hinging of said cover between an open position and a closed position;

a latch at a second edge of said cover, said second edge being opposed to said first edge;

said latch being latchable to secure said cover against a facing surface of said housing;

said U-shaped hinge part being shaped to be forced into close contact with said shaft when said cover is in its latched position;

said U-shaped hinge part being shaped to permit disengagement of said U-shaped hinge from said shaft when said cover is at least partly opened;

at least a portion of said U-shaped hinge part describing substantially more than 180 degrees with an opening substantially smaller than a diameter of said shaft, whereby said shaft is captured in said U-shaped hinge part; and said opening being sufficiently further opened by force on said cover when said cover is at least partly open to pass said shaft for removal of said cover.

6. A memory card connector as in claim 5, further comprising:

means for sliding said cover from said closed position to said latched position;

first means for locking said cover in said latched position;

said first means for locking along said first edge of said cover;

second means for locking said cover in said latched position;

said second means for locking along said second edge of said cover; and said means for sliding engaging said first and second means for locking whereby, said cover is prevented from opening.

7. A memory card connector as in claim 5, further comprising:

at least first and second sections of said U-shaped hinge part;

said first and second sections forced into close contact with a bottom side of said shaft when said cover is in said latched position;

at least a portion of said first section describing up to 180 degrees about said shaft; and at least a portion of said second section describing substantially more than 180 degrees about said shaft; and said portion of said second section permitting elastic disengagement of said cover from said shaft in response to said force.

8. A memory card connector as in claim 5, further comprising:

a tip end portion on said second section; and said tip end portion elastically opened by said force on said cover to pass said shaft for removal of said cover.

9. A memory card connector as in claim 7, wherein:

said U-shaped hinge part includes at least two said first sections;

said U-shaped hinge part includes at least two said second sections; and said first and second sections in alternating positions on said first edge of said cover.

* * * * *